US009832172B2

United States Patent
Smith et al.

(10) Patent No.: US 9,832,172 B2
(45) Date of Patent: Nov. 28, 2017

(54) CONTENT PROTECTION FOR DATA AS A SERVICE (DAAS)

(71) Applicant: Intel Corporation, Santa Clara, CA (US)

(72) Inventors: Ned M. Smith, Hillsboro, OR (US); Nathan Heldt-Sheller, Portland, OR (US); Pablo A. Michelis, Cordoba (AR); Vincent J. Zimmer, Federal Way, WA (US); Matthew D. Wood, Portland, OR (US); Richard T. Beckwith, Hillsboro, OR (US); Michael A. Rothman, Puyallup, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/361,759

(22) PCT Filed: Dec. 24, 2013

(86) PCT No.: PCT/US2013/077656
§ 371 (c)(1),
(2) Date: May 30, 2014

(87) PCT Pub. No.: WO2015/099698
PCT Pub. Date: Jul. 2, 2015

(65) Prior Publication Data
US 2015/0281186 A1 Oct. 1, 2015

(51) Int. Cl.
*H04L 29/06* (2006.01)
*G06F 21/10* (2013.01)
(Continued)

(52) U.S. Cl.
CPC .......... *H04L 63/0428* (2013.01); *G06F 21/10* (2013.01); *G06F 21/60* (2013.01);
(Continued)

(58) Field of Classification Search
CPC .... G06F 21/10; G06F 21/6218; G06F 21/606; G11B 20/00086; H04L 63/0428
(Continued)

(56) References Cited

U.S. PATENT DOCUMENTS

| | | | |
|---|---|---|---|
| 7,545,943 B2 * | 6/2009 | Kamibayashi ... | G11B 20/00086 380/277 |
| 7,801,820 B2 * | 9/2010 | Molaro ................... | G06F 21/10 705/50 |

(Continued)

FOREIGN PATENT DOCUMENTS

EP 1387238 A2 2/2004

OTHER PUBLICATIONS

International Preliminary Report on Patentability and Written Opinion received for PCT Patent Application No. PCT/US2013/077656, dated Sep. 26, 2014, 14 pages.
(Continued)

*Primary Examiner* — Venkat Perungavoor
*Assistant Examiner* — Peiliang Pan
(74) *Attorney, Agent, or Firm* — Grossman, Tucker, Perreault & Pfleger, PLLC (57) ABSTRACT

The present disclosure is directed to content protection for Data as a Service (DaaS). A device may receive encrypted data from a content provider via DaaS, the encrypted data comprising at least content for presentation on the device. For example, the content provider may utilize a secure multiplex transform (SMT) module in a trusted execution environment (TEE) module to generate encoded data from the content and digital rights management (DRM) data and to generate the encrypted data from the encoded data. The device may also comprise a TEE module including a secure demultiplex transform (SDT) module to decrypt the encoded data from the encrypted data and to decode the content and
(Continued)

DRM data from the encoded data. The SMT and SDT modules may interact via a secure communication session to validate security, distribute decryption key(s), etc. In one embodiment, a trust broker may perform TEE module validation and key distribution.

18 Claims, 6 Drawing Sheets (51) Int. Cl.
*H04N 21/4405* (2011.01)
*H04N 21/4627* (2011.01)
*G06F 21/60* (2013.01)

(52) U.S. Cl.
CPC ..... *H04N 21/4405* (2013.01); *H04N 21/4627* (2013.01); *H04L 63/0485* (2013.01); *H04L 2463/101* (2013.01)

(58) Field of Classification Search
USPC .......................................................... 726/27
See application file for complete search history.

(56) References Cited

U.S. PATENT DOCUMENTS

| | | | |
|---|---|---|---|
| 8,245,307 B1* | 8/2012 | Pharris | H04L 9/3234 713/176 |
| 8,850,543 B2 | 9/2014 | Von Bokern et al. | |
| 9,110,902 B1* | 8/2015 | Dorwin | G06F 21/6209 |
| 2002/0097872 A1* | 7/2002 | Maliszewski | H04N 7/1675 380/217 |
| 2002/0152393 A1* | 10/2002 | Thoma | H04L 63/0435 713/189 |
| 2004/0107356 A1* | 6/2004 | Shamoon | H04L 63/0428 713/193 |
| 2004/0117500 A1* | 6/2004 | Lindholm | G06F 21/10 709/231 |
| 2006/0015945 A1* | 1/2006 | Fields | G06F 21/606 726/27 |
| 2006/0184802 A1 | 8/2006 | Ibrahim et al. | |
| 2006/0248594 A1* | 11/2006 | Grigorovitch | H04N 7/163 726/26 |
| 2007/0220279 A1* | 9/2007 | Northcutt | H04L 25/03159 713/193 |
| 2009/0240923 A1 | 9/2009 | Covey et al. | |
| 2010/0172630 A1* | 7/2010 | Chou | G11B 20/00086 386/252 |
| 2011/0093722 A1* | 4/2011 | Devanand | H04L 63/10 713/189 |
| 2012/0102307 A1 | 4/2012 | Wong | |
| 2012/0163589 A1 | 6/2012 | Johnson et al. | |
| 2012/0173877 A1* | 7/2012 | Pendakur | G06F 21/123 713/169 |
| 2012/0226915 A1 | 9/2012 | Zollinger et al. | |
| 2013/0013928 A1 | 1/2013 | Thom et al. | |
| 2013/0042295 A1 | 2/2013 | Kelly et al. | |
| 2013/0152180 A1 | 6/2013 | Nair et al. | |
| 2013/0311764 A1 | 11/2013 | Alpert et al. | |
| 2014/0068661 A1* | 3/2014 | Gates, III | H04N 21/458 725/34 |
| 2014/0359305 A1* | 12/2014 | Pappachan | H04L 9/14 713/189 |
| 2014/0379924 A1* | 12/2014 | Das | H04L 47/72 709/226 |
| 2015/0012977 A1* | 1/2015 | Huh | G06F 9/468 726/4 |
| 2015/0134752 A1* | 5/2015 | Bledsoe | H04L 51/18 709/206 |
| 2015/0143118 A1* | 5/2015 | Sheller | H04L 9/3223 713/168 |
| 2015/0172600 A1* | 6/2015 | Nanda | H04N 7/1675 380/201 |
| 2015/0281186 A1* | 10/2015 | Smith | G06F 21/10 726/27 |

OTHER PUBLICATIONS

Miroll, et al., "Reverse Genlock for Synchronous Tiled Display Walls with Smart Internet Displays," http://www.intel-vci.uni-saarland.de/en/team, Jun. 30, 2012, 5 pages, Germany.
International Preliminary Report on Patentability and Written Opinion issued in corresponding PCT Application No. PCT/US2013/077656, dated Jul. 7, 2016.
Extended European Search Report issued in European Application No. 13900208.3, dated Jul. 14, 2017, 10 pages.
Zheng, Yu, et al: "Secure DRM Scheme for Future Mobile Networks Based on Trusted Mobile Platform", Wireless Communications, Networking and Mobile Computing, 2005 International Conference on Wuhan, China, Sep. 23-26, 2005, Piscataway, NJ, USA,IEEE, vol. 2, Sep. 23, 2005, pp. 1164-1167.

* cited by examiner

CONTENT PROTECTION FOR DATA AS A SERVICE (DAAS)

TECHNICAL FIELD

The present disclosure relates to data security, and more particularly, to a scheme for allowing the secure transmission, reception and presentation of content transmitted via DaaS.

BACKGROUND

In general, Data as a Service (DaaS) allows data to be delivered to any device at any time or place. Prior to DaaS software and data were combined. A user desiring certain data would purchase proprietary software linked to the data provider. However, advances in how data may be delivered to users have created a market simply for the provision of data. DaaS separates the application employed in consuming the data from the actual data itself. A data provider is now able to provide their data as a service, allowing users to choose to consume the data in any manner they desire. A substantial area of growth for DaaS is in the provision of multimedia content (e.g., text, images, audio, video, etc.). The expansion of broadband coverage worldwide, along with increased wireless data delivery speeds, has allowed DaaS content providers to deliver instantaneous or continuous (e.g., streaming) data to users in any location (e.g., via wired or wireless communication) with high quality. As a result, demand for this type of content delivery has grown substantially.

At least one issue with delivering multimedia content via DaaS is how to protect the content being broadcast. The elimination of proprietary presentation software (e.g., content presentation clients) has standardized how the content is delivered. For example, Advanced Video Coding (e.g., H.264/MPEG-4 Part 10) supports content encryption that was designed based on a point-to-point security model. Employing this model in a broadcast environment may allow for Man-in-the-middle (MITM) attacks wherein unauthorized users may intercept and rebroadcast the content in a manner that may be detectable to the content provider and/or the authorized user. Overall, the multitude of content delivery scenarios possible under DaaS introduces security and privacy threats that previous systems did not envision. These issues may be compounded by rights issues for licensed content. For example, it may be possible to overcome digital rights management (DRM) for licensed content in existing DaaS systems.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to content protection for DaaS. In general, a device may receive encrypted data from a content provider via DaaS, the encrypted data comprising at least content for presentation on the device. In one embodiment, the content provider may utilize a secure multiplex transform (SMT) module in a trusted execution environment (TEE) module to generate encoded data by encoding the content along with content-related digital rights management (DRM) data, and to then generate the encrypted data by encrypting the encoded data. The device may also comprise a TEE module including a secure demultiplex transform (SDT) module to decrypt the encoded data from the encrypted data and to then decode the content and DRM data from the encoded data. The SMT and SDT modules may interact (e.g., via a secure communication session established between the TEE modules) to validate TEE module security, to distribute key(s) for use in decrypting the encrypted data, etc. In one embodiment, a trust broker may be interposed between the content provider and the device to perform TEE module validation, key distribution, etc.

In one embodiment, an example device configured for content protection may comprise at least a communication module, a user interface (UI) module and a TEE module. The communication module may be to at least receive data encrypted using a first encryption protocol. The UI module may be to at least present content. The TEE module may include at least a secure demultiplex transform (SDT) module to generate the content from the encrypted data.

An example TEE module may comprise at least a secure memory space accessible to only applications in the device verified as safe by the TEE module. An example SDT may comprise a decryption module to generate encoded data by decrypting the encrypted data and a decoder module to generate at least the content by decoding the encoded data. The decoder module may further be to generate DRM data corresponding to the content from the encoded data. The communication module may be to receive the encrypted data from a content provider. The content provider may be to utilize a second TEE module including a secure multiplex transform (SMT) module to encode the content and DRM data into the encoded data and to encrypt the encoded data into the encrypted data. The communication module may further be to receive the encrypted data from the content provider via a DaaS display controller. In an example implementation, the SDT module may also comprise an attestation module to communicate via a secure communication session to at least one of provide data for validating the TEE module or to receive at least one key for use in generating the content. The attestation module may further be to cause the communication module to establish the secure communication session with the content provider or a trust broker.

In one embodiment, the SDT module may further be to encrypt the content using a second encryption protocol prior to providing the content to the UI module. The UI module may comprise a presentation engine to decrypt the encrypted content, to generate presentation data from the decrypted content and to encrypt the presentation data using a third encryption protocol, and presentation equipment to decrypt the encrypted presentation data and to present the presentation data. A method for content protection consistent with the present disclosure may comprise, for example, receiving data encrypted using a first encryption protocol in a device including at least a TEE module, decoding the encrypted data in a SDT module in the TEE module, generating content from the decrypted data in the SDT module and presenting the content.

Figure 1:
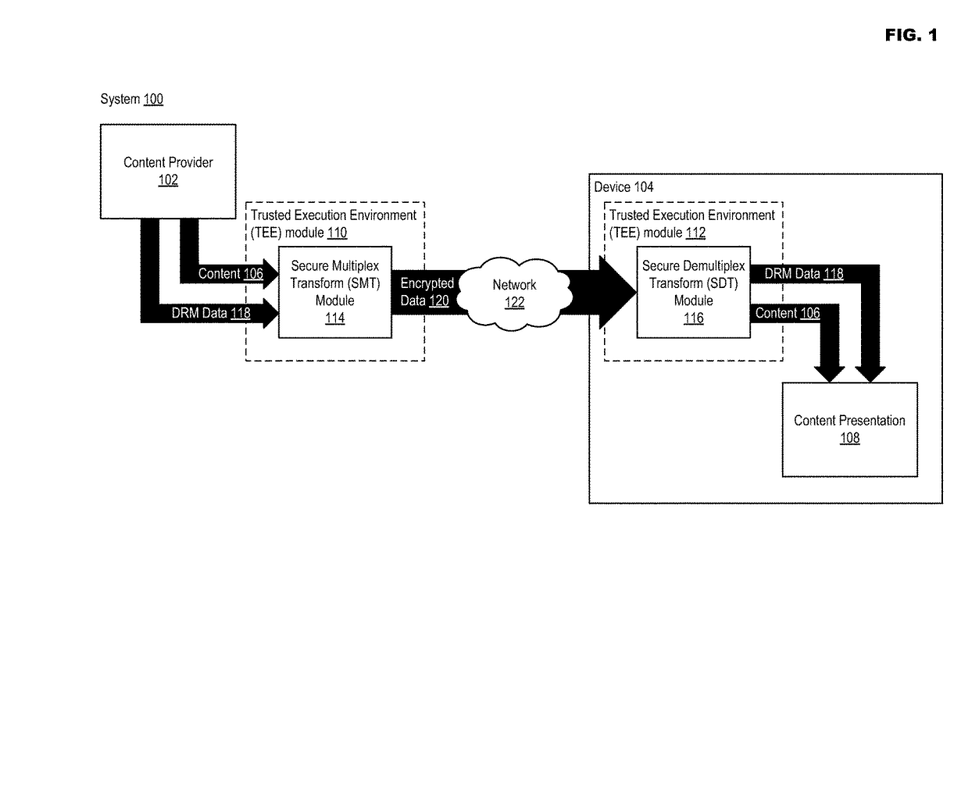
FIG. 1 illustrates an example system usable to implement content protection for DaaS in accordance with at least one embodiment of the present disclosure.

FIG. 1 illustrates an example system usable to implement content protection for DaaS in accordance with at least one embodiment of the present disclosure. Example system 100 may comprise content provider 102 and device 104. Consistent with the present disclosure, an example of DaaS interaction may comprise content provider 102 transmitting content 106 (e.g., multimedia data including text, audio, images, video, etc.) to device 104. Device 104 may then proceed to present content 106 to a user of device 104 as illustrated at 108. Content provider 102 may include, for example, at least one computing device accessible via a wide area network (WAN) such as the Internet. An example of content provider 102 may include one or more servers organized in a cloud computing configuration. Examples of device 104 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a smart television, small form factor computing solutions (e.g., for space-limited applications, television-top boxes, etc.) such as the Next Unit of Computing (NUC) platform from the Intel Corporation, etc.

System 100 may further comprise, for example, TEE modules 110 and 112 associated with content provider 102 and device 104, respectively. TEE modules 110 and 112 may be incorporated within content provider 102 and device 104, respectively, may be separate from content provider 102 and/or device 104 (e.g., may provide certain functionality in response to instructions received from content provider 102 and/or device 104, may provide the certain functionality as a service offered through a third party), etc. TEE 110 and 114 may be secure workspaces in which known-good applications may execute, confidential data may be stored in a secure manner, etc. In one example implementation, TEE 110 and 114 may use Software Guard Extensions (SGX) technology developed by the Intel Corporation. SGX may provide a secure and hardware-encrypted computation and storage area inside of the system memory, the contents of which cannot be deciphered by privileged code or even via the application of hardware probes to a memory bus. When TEE modules 110 and 112 are protected by SGX, embodiments consistent with the present disclosure make it impossible for an intruder to decipher the contents of TEE modules 110 and 112. Protected data cannot be observed outside of SGX, and thus, is inaccessible outside of SGX.

In an example implementation wherein TEE modules 110 and 112 are implemented via SGX, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Data may also be protected in TEE modules 110 and 112. For example, known-good programs in TEE modules 110 and 112 may encrypt data (e.g., keys, passwords, licenses, etc.) so only verified good programs may decrypt this information. Moreover, it is possible for content provider 102 and device 104 to include additional TEE modules beyond TEE modules 110 and 112. The use of more than one of TEE module may increase security in that if either TEE module 110 or 112 is compromised the security of the remaining TEE modules may remain intact.

TEE module 110 may comprise at least SMT module 114 and TEE module 112 may comprise at least SDT module 116. In an example of operation, content provider 102 may provide content 106 and DRM data 118 to SMT module 114. DRM data 118 may comprise, for example, usage policy, license terms, etc. corresponding to content 106. DRM data 118 may specify the extent of the license for content 106 (e.g., to whom is the license granted, the duration of the license, locations where the license is valid, etc.), the manner in which content 106 may be presented, if content 106 may be copied, etc. Content 106 along and DRM data 118 may be encoded by SMT module 114, which may then encrypt the encoded data to yield encrypted data 120. Encrypted data 120 may be transmitted via network 122 to device 104. SDT module 116 in device 104 may then decrypt encrypted data 120 received from content provider 102 (e.g., utilizing at least one decryption key provided by SMT module 114 in TEE module 110) to obtain the encoded data, and may then proceed to decode the encoded data to generate at least content 106 and DRM data 118. Content presentation 108 may comprise a presentation of content 106 in accordance with rules/policies set forth in DRM data 118.

At least one benefit that may be realized in accordance with system 100 is that content 106 may be provided to device 104 as a service with an assurance that the content will not be intercepted en-route. The encoding/encryption processes, as well as the decoding/decryption processes, may be protected within TEE modules 110 and 112, respectively. This additional layer of protection helps to ensure that no application, unauthorized user, etc. is able to access the content and/or the encryption keys utilized to encode the content. Content providers 102 may feel more secure about transmitting their content, and thus, more content may become available via DaaS, which may benefit users of device 104 in terms of variety of content, etc.

Figure 2:
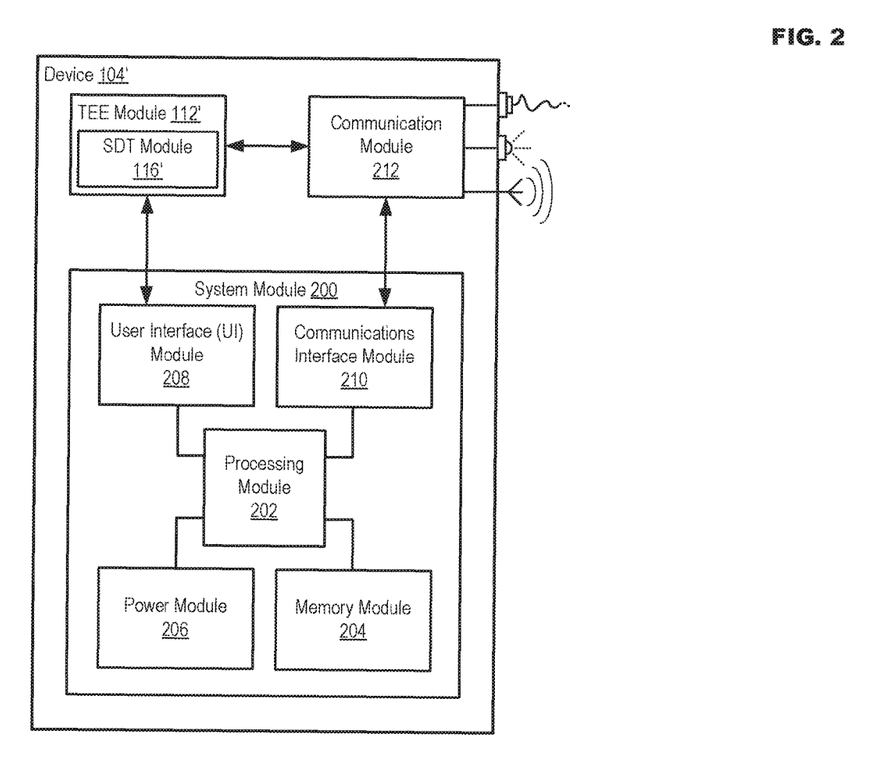
FIG. 2 illustrates an example configuration for a device in accordance with at least one embodiment of the present disclosure.

FIG. 2 illustrates an example configuration for a device in accordance with at least one embodiment of the present disclosure. In particular, device 104' may be able to perform example functionality such as disclosed in FIG. 1. However, device 104' is meant only as an example of equipment usable in embodiments consistent with the present disclosure, and is not meant to limit these various embodiments to any particular manner of implementation.

Device 104' may comprise system module 200 to manage device operations. System module 200 may include, for example, processing module 202, memory module 204, power module 206, UI module 208 and communication interface module 210. Device 104' may also include at least communication module 212 and TEE module 112'. While communication module 212 and TEE module 112' have been shown separately from system module 200, the example implementation of device 104' has been provided merely for the sake of explanation herein. Some or all of the functionality associated with communication module 212 and/or TEE module 112' may also be incorporated within system module 200.

In device 104', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 104'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 104'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory to hold information during the operation of device 104' such as, for example, static RAM (SRAM) or dynamic RAM (DRAM). ROM may comprise memories utilizing a Basic Input/output System (BIOS) or Unified Extensible Firmware Interface (UEFI) for performing boot operations, programmable memories such as, for example, electronic programmable ROMs (EPROMS), Flash, etc. Memory module 203 may also comprise magnetic memories including, for example, floppy disks, fixed/removable hard drives, etc., electronic memories including, for example, solid state flash memory (e.g., embedded multimedia card (eMMC), etc.), removable cards/sticks (e.g., micro storage devices (uSD), USB, etc.), optical memories including, for example, compact disc ROM (CD-ROM), digital video disc (DVD), etc.

Power module 206 may include internal power sources (e.g., a battery, fuel cell, etc.) and/or external power sources (e.g., electromechanical or solar generation, power grid, etc.), and related circuitry configured to supply device 104' with the energy needed to operate. UI module 208 may comprise equipment and/or software to help facilitate user interaction with device 104' such as, for example, various input mechanisms (e.g., microphones, switches, buttons, knobs, keyboards, speakers, touch-sensitive surfaces, one or more sensors configured to capture images, video and/or to sense proximity, distance, motion, gestures, orientation, etc.) and various output mechanisms (e.g., speakers, displays, lighted/flashing indicators, electromechanical components for vibration, motion, etc.). The above example equipment associated with UI module 208 may be incorporated within device 104' or may be external to device 104' and communicatively coupled via a wired or wireless communication medium.

Communication interface module 210 may handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may prevent interference between different active wireless links in communication module 212. In performing this function, communication interface module 210 may schedule activities for communication module 212 based on, for example, the relative priority of messages awaiting transmission.

In the embodiment illustrated in FIG. 2, TEE module 112' may interact with at least UI module 208 and communication module 212 in device 104'. In an example of operation, TEE module 112' may receive encrypted data 120 via communication module 212. TEE module 112', comprising at least SDT module 116', may proceed to decrypt encrypted data 120 to obtain encoded data and then decode the encoded data to obtain content 106 and DRM data 118. TEE module 112' may then provide content 106 (and possibly DRM data 118) to UI module 208 for presentation of content 106 to the user (e.g., content presentation 108).

Figure 3:
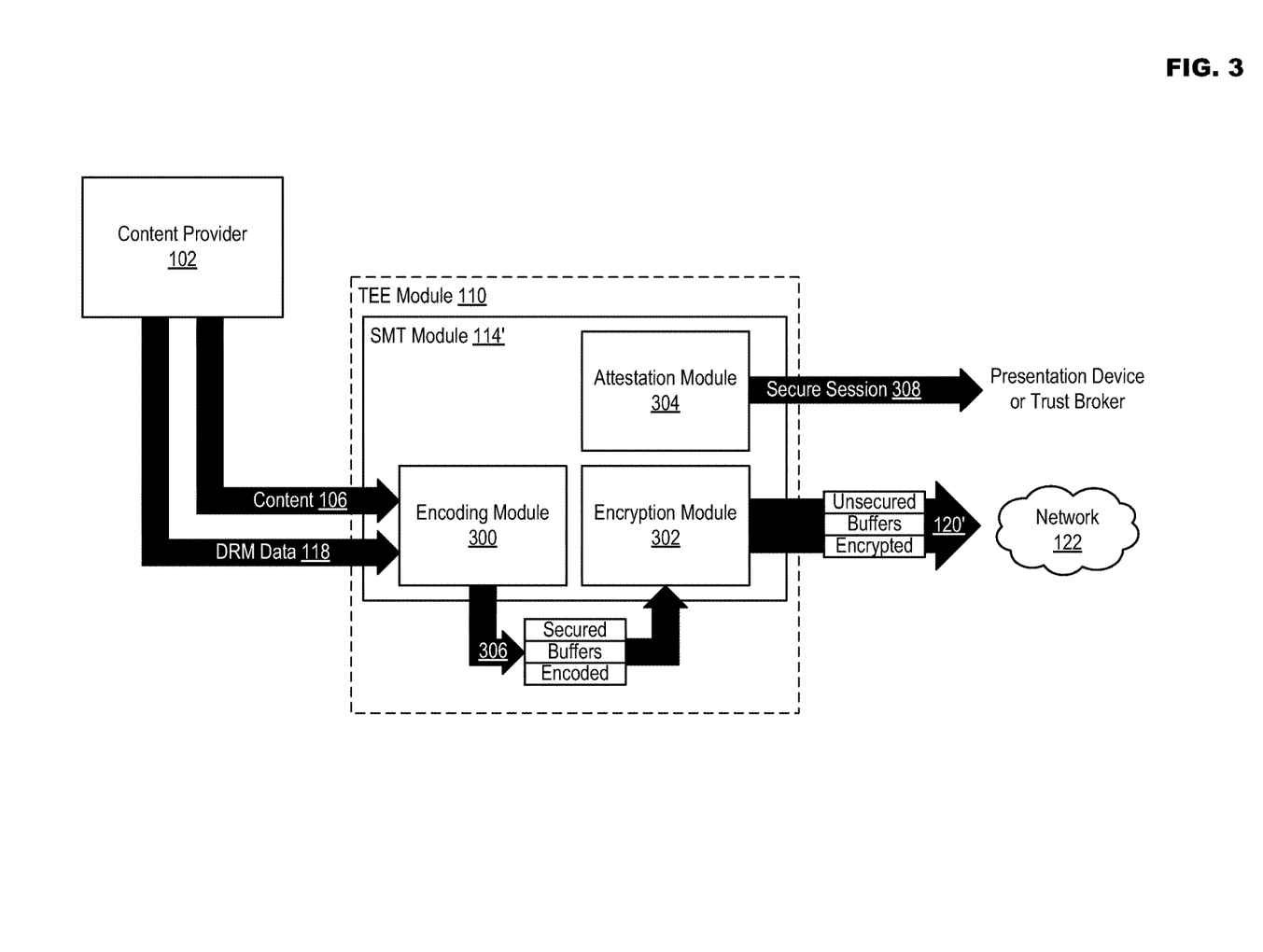
FIG. 3 illustrates an example of content provider architecture in accordance with at least one embodiment of the present disclosure.

FIG. 3 illustrates an example of content provider architecture in accordance with at least one embodiment of the present disclosure. Consistent with the present disclosure, SMT module 114' may comprise, for example, encoding module 300, encryption module 302 and attestation module 304. Encoding module 300 may receive content 106 and DRM data 118 from content provider 102. At least operation performed by encoding module 300 may be to encode content 106 and DRM data 118 into a single encoded data frame. The encoded data may then be stored in secured buffers 306 (e.g., within the secure workspace associated with TEE 110). Encryption module 302 may receive the encoded data from secured buffers 306 and may be encrypted by encryption module 302. encrypted 120' data may then be stored in unsecured buffers prior to transmitting encrypted data 120' (e.g., to device 104 via network 122). Network 122 may be a local area network (LAN), a WAN such as the Internet, etc.

Attestation module 304 may perform validation-related and/or encryption key-related operations via secure communication session 308. Secure communication session 308 may be secured utilizing, for example, a SIGMA (Sign-and-Mac) key encryption protocol. In an example of operation, prior to transmitting encrypted data 120' attestation module 304 may request data to validate the security of any devices intended to receive encrypted data 120' (e.g., device 104). The request may be transmitted directly to device 104, or alternatively, system 100 may comprise a trust broker to provide validation and key distribution services. A trust broker may comprise, for example, at least one computing device (e.g., a server) accessible via a LAN or WAN such as the Internet. Content providers 102 and devices 104 may employ the services provided by the trust broker for defining trust parameters, key exchanges and the like. At least one objective of attestation is to get SMT module 114 and TEE module 112 to agree on trust parameters. This may most easily be done using the trust broker. The trust broker may broker the exchange of TEE configuration information and identity credentials to generate a policy on which SMT module 114 and TEE module 112 may agree. Agreement may be achieved, for example, by constructing a whitelist of values that are mutually acceptable. As long as SMT module 114 and TEE module 112 match an entry on the whitelist, the trust broker may be authorized to permit device interaction (e.g., to allow the encrypted data 120 to be transmitted from TEE module 110 to device 104).

For example, in response to the request issued by attestation module 304, data may be provided regarding the setup of device 104, TEE 112 and/or SDT module 116. The response information may comprise, but is not limited to, data identifying device 104 and/or TEE 112, version information for TEE module 112, keys corresponding to TEE module 112, etc. In one embodiment, the SIGMA secure communication session may be signed by TEE module 112 using an Enhanced Privacy Identification (EPID). An EPID may allow for authentication utilizing a hardware-based identification installed as firmware at the time of manufacture of the processor chipset in device 104. EPID may be used to establish that TEE module 112 is based on a known-good chipset. The response may also comprise keys for use by encryption module 302 when encrypting content 106 and/or DRM data 118 into encrypted data 120'. In one embodiment, content 106 may be encoded and encrypted by SMT module 114' without DRM data 118. DRM data 118 may then be provided to device 104 via secure session 308.

Figure 4:
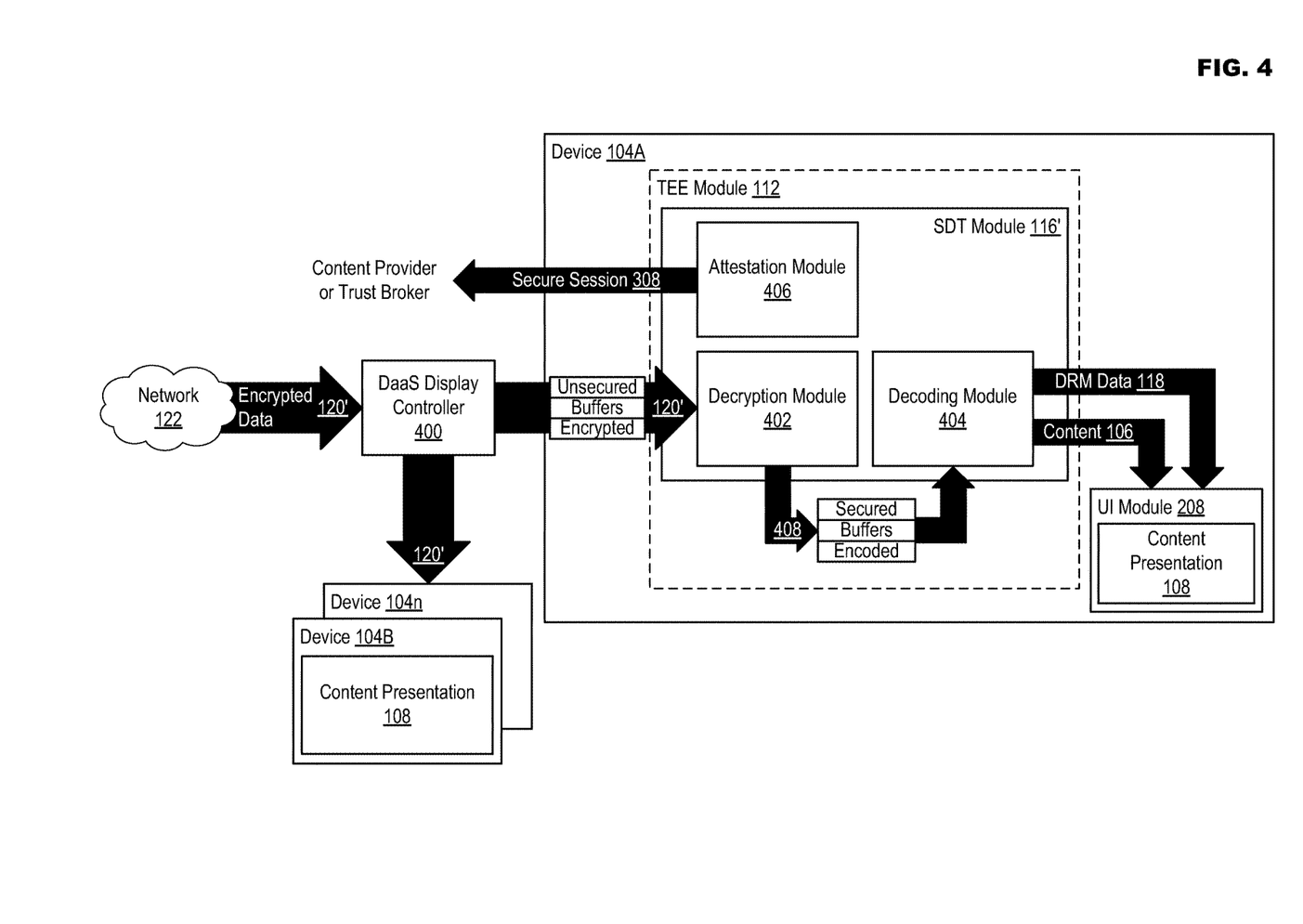
FIG. 4 illustrates an example of content presentation architecture in accordance with at least one embodiment of the present disclosure.

FIG. 4 illustrates an example of content presentation architecture in accordance with at least one embodiment of the present disclosure. In one embodiment, encrypted data 120' may be received first by DaaS display controller 400 for distribution to device 104A, device 104B . . . device 104n (collectively, "devices 104A . . . n"). More than one device 104 may be employed in system 100 when, for example, devices 104A . . . n are displays being integrated to form a large composite display, when users in disparate locations are viewing content 106 on different devices, etc. Some or all of DaaS display controller 400 may be incorporated in devices 104A . . . n, or alternatively, may be a standalone entity (e.g., at least one computing device accessible via a WAN like the Internet). DaaS display controller 400 may distribute encrypted data 120' to devices 104A . . . n as required. The example features and/or operation disclosed in regard to device 104A may be similar for any device 104A . . . n shown in FIG. 4.

In an example of operation, device 104A may initially receive encrypted data 120' into unsecured buffers. SDT module 116' may comprise, for example, decryption module 402, decoding module 404 and attestation module 406. Decryption module 402 may receive encrypted data 120' and may proceed to generate encoded data by decrypting encrypted data 120'. The encoded data may be stored in secured buffers 408 (e.g., secured buffers 408 may be protected within TEE 112). Decoding module 404 may retrieve the encoded data from secured buffers 408 and may decode the encoded data into content 106 and DRM data 118. UI module 208 may receive at least content 106 and may present content 106 as shown at 108 (e.g., may display text, images, video based on video data in content 106, may generate sound based on audio data in content 106, may cause motion to be generated electromechanically in device 104, etc.). UI module 208 may also receive DRM data 118, and may employ DRM data 118 to control content presentation 108 (e.g., to control how content 106 is presented).

Attestation module 406 may interact with content provider 102 and/or a trust broker via secure communication session 308. During this interaction attestation module 406 may provide data for validating device 104, TEE module 112 and/or SDT module 116', and may receive at least one decryption key for use in decrypting encrypted data 120'. In one embodiment, multiple keys may be provided to attestation module 406 for different modes of operation. For example, a first key may be provided to present content 106 in a preview-only mode (e.g., lower-resolution playback, only a portion of content 106 is presented, playback is authorized for a limited duration, etc.). The preview-only mode may allow users of devices 104A . . . n to determine their interest in a fully-enabled content presentation 108. At least one subsequent key may be received after, for example, a user pays to see a fully-enabled content presentation 108. Transmission of the at least one subsequent key may be triggered after, for example, content provider 102 or the trust broker authorizes devices 104A . . . n/users to view a fully-enabled content presentation 108, a subsidiary or third-party transactional system acknowledges that a fully-enabled content presentation 108 has been purchased by a user, etc.

Figure 5:
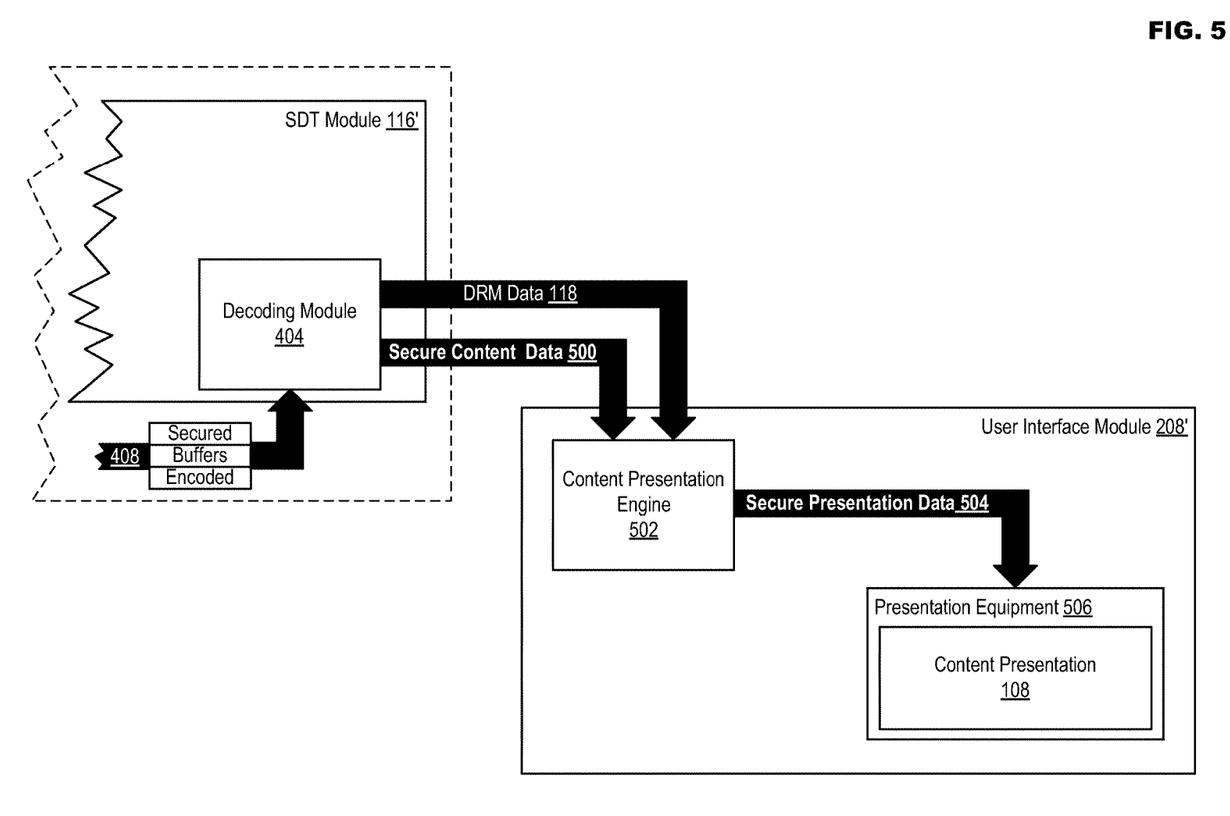
FIG. 5 illustrates an example of end-to-end content protection in accordance with at least one embodiment of the present disclosure.

FIG. 5 illustrates an example of end-to-end content protection in accordance with at least one embodiment of the present disclosure. The features and/or operations disclosed in regard to FIGS. 1 to 4 may protect content 106 from transmission from content provider 102 until reception at device 104. However, following processing by SDT module 116', content 106 is in an unsecured form that may potentially be intercepted prior to content presentation 108 (e.g., by viruses, malware, hacks, etc.). Consistent with the present disclosure, FIG. 5 illustrates an example configuration applicable to devices 104A . . . n that may help to keep content 106 secure until content presentation 108 (e.g., providing "end-to-end" protection).

A portion of TEE module 112 comprising secured buffers 408 and SDT module 116' including at least decoding module 404 is illustrated in FIG. 5 to provide context back to the example originally disclosed in FIG. 4. In this instance, however, decoding module 404 is not simply providing context 106 to user interface module 128'. Instead, decoding module 404 (or another module in SDT module 116' or TEE 112) may encrypt content 106 to yield secure content data 500. An example of an encryption usable for this purpose is Protected Audio Video Path (PAVP) encryption developed by the Intel Corporation. The encryption may protect content 106 as it is transmitted outside of the security provided by TEE 112.

User interface module 208' may comprise at least content presentation engine 502 and presentation equipment 506. Content presentation engine 502 may comprise equipment (e.g., audio and/or video processing chips, chipsets, cards, etc.) and/or software (e.g., audio and/or video drivers, utilities, interfaces, etc.) for processing content 106 into data for presentation by presentation equipment 506. In an example of operation, upon receiving secure content data 500, content presentation engine 502 may decrypt content 106 and may process content 106 in preparation for presentation. In one embodiment, content presentation engine 502 may further encrypt the presentation data using a different encryption method to yield secure presentation data 504. An example of encryption usable by content presentation engine 502 for encrypting the presentation information is High-Bandwidth Content Protection (HDCP) developed by the Intel Corporation. Presentation equipment 506 may comprise playback equipment (e.g., monitors, speakers, haptic feedback devices, etc.) for performing content presentation 108. In an example of operation, presentation equipment 506 may receive and decrypt secure presentation data 504 into presentation data, which may be utilized to perform content presentation 108 (e.g., display text, images, video, generate sound, motion, etc.)

Figure 6:
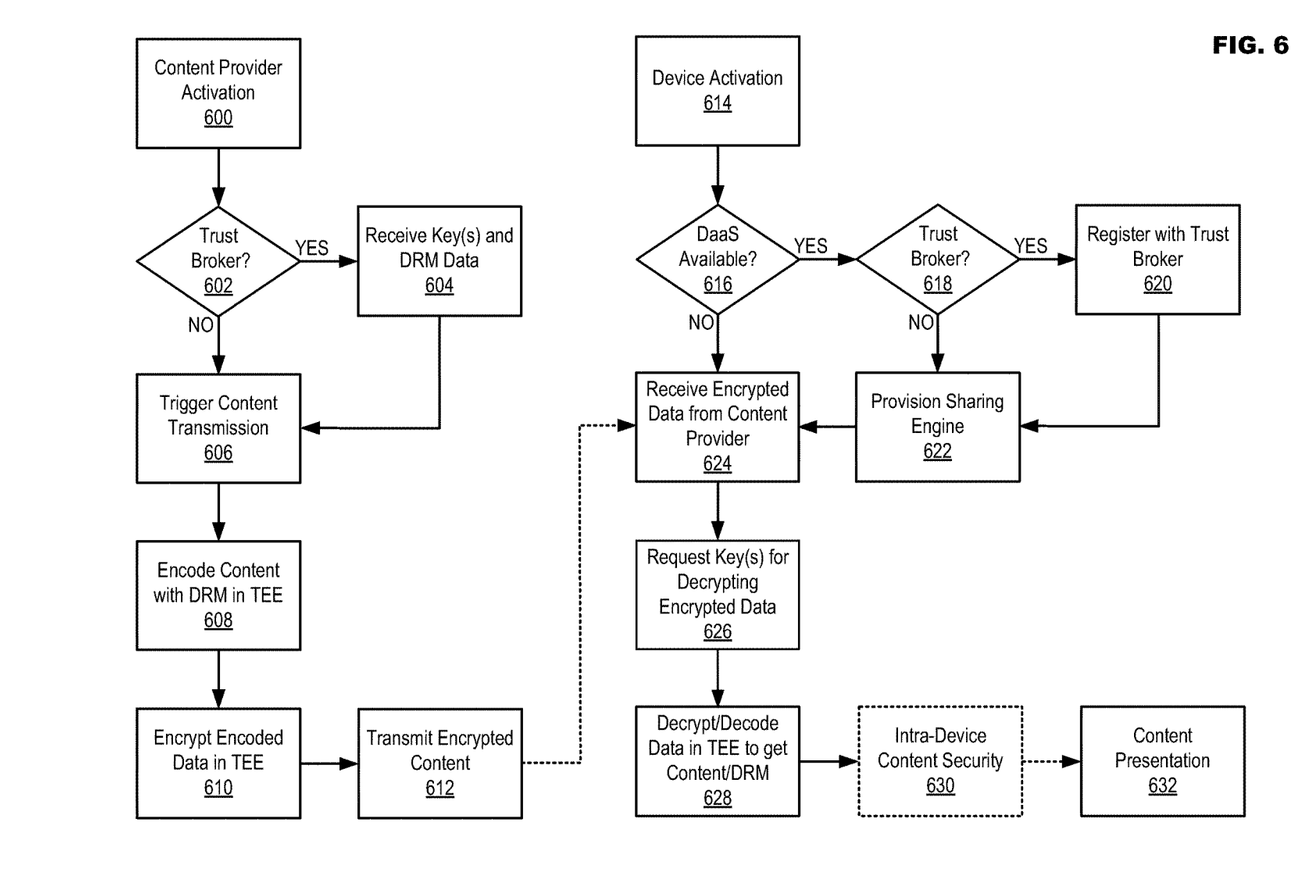
FIG. 6 illustrates example operations for content protection for DaaS in accordance with at least one embodiment of the present disclosure.

FIG. 6 illustrates example operations for content protection for DaaS in accordance with at least one embodiment of the present disclosure. In the example disclosed in FIG. 6, operations 600 to 612 may apply to a content provider and operations 614 to 632 may apply to a device that may present content received from the content provider. In operation 600, the content provider may be activated. Content provider activation may comprise, for example, the activation of some or all of the computing architecture for the content provider or simply the activation of the content provision functionality for the content provider. A determination may be made in operation 602 as to whether a trust broker will be interposed between the content provider and devices to, for example, perform security validation, distribute keys, etc. If in operation 603 it is determined that a trust broker will interposed between the content provider and devices, then in operation 604 at least one encryption key and/or DRM data for transmission along with the content may be received from the trust broker. In one embodiment, more than one encryption key may be obtained from the trust broker to support more than one mode of presentation (e.g., a preview mode and a fully-enabled mode). A determination in operation 602 that a trust broker is not present, or operation 604, may be followed by operation 606 where content transmission may be triggered. The triggering of content transmission may occur periodically, in response to an event occurring in the content provider, in response to a request from a device, etc. The content and DRM data may then be encoded in operation 608, and in operation 610 the encoded data may then be encrypted (e.g., utilizing the at least one key). The encrypted data may then be transmitted in operation 612.

Now referring to device-related actions, in operation 614 device activation may occur. Device activation may include power up/reboot of some or all of the device systems, or may simply pertain to content playback systems in the device. A determination may be made in operation 616 as to whether DaaS content delivery is available to the device. If in operation 616 it is determined that DaaS content delivery is available, then in operation 618 a further determination may be made as to whether a trust broker will be interposed between the content provider and the device. If in operation 618 it is determined that a trust broker exists, then in operation 620 the device may register with the trust broker. Registration may include the device providing information for validating the device, a TEE module in the device or an SDT module in the TEE module. A determination in operation 618 that a trust broker does not exist, or operation 620, may be followed by operation 622 wherein a content sharing engine may be provisioned. The content sharing engine may be, for example, a DaaS display controller for routing content to more than one device for content presentation (e.g., or for routing portions of content to more than one device for content presentation in the instance of a composite display made up of a plurality of individual presentation devices).

A determination in operation 616 that DaaS is not available, or operation 622, may be followed by operation 624 wherein encrypted data is received from the content provider. At least one decryption key may be requested for decrypting the encrypted data in operation 626. The at least one decryption key may be requested from the trust broker or directly from the content provider if no trust broker exists. In operation 628, the encrypted data may be decrypted to obtain the encoded data, and then the encoded data may be decoded to obtain the content and/or DRM data. Operation 630 may be optional in that intra-device content security (e.g., such as presented in FIG. 5) in not essential to content presentation, but may be employed consistent with the present disclosure to provide end-to-end content protection. For example, without operation 630, the content may simply be presented in operation 632. When end-to-end content protection is employed, the content may be encrypted in the TEE module utilizing a second encryption protocol (e.g., different from the encryption protocol used by the content provider) and the encrypted content may then be provided to a UI module in the device. In operation 630, a content presentation engine in the UI module may decrypt the content and process the content into presentation data. The content presentation engine may then encrypt the presentation data utilizing a third encryption protocol (e.g., different from the encryption protocols used by the content provided and TEE) and may provide the encrypted presentation data to presentation equipment also in the UI module. In operation 632, the presentation equipment may decrypt the encrypted presentation data and may present the presentation data (e.g., may display text, images, video, generate sound, motion, etc.)

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to content protection for Data as a Service (DaaS). A device may receive encrypted data from a content provider via DaaS, the encrypted data comprising at least content for presentation on the device. For example, the content provider may utilize a secure multiplex transform (SMT) module in a trusted execution environment (TEE) module to generate encoded data from the content and digital rights management (DRM) data and to generate the encrypted data from the encoded data. The device may also comprise a TEE module including a secure demultiplex transform (SDT) module to decrypt the encoded data from the encrypted data and to decode the content and DRM data from the encoded data. The SMT and SDT modules may interact via a secure communication session to validate security, distribute decryption key(s), etc. In one embodiment, a trust broker may perform TEE module validation and key distribution.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for content protection for DaaS, as provided below.

Example 1

According to this example there is provided a device configured for content protection. The device may comprise a communication module to at least receive data encrypted using a first encryption protocol, a user interface (UI) module to at least present content and a trusted execution environment (TEE) module including at least a secure demultiplex transform (SDT) module to generate the content from the encrypted data.

Example 2

This example includes the elements of example 1, wherein the TEE module comprises at least a secure memory space accessible to only applications in the device verified as safe by the TEE module.

Example 3

This example includes the elements of example 2, wherein the SDT comprises a decryption module to generate encoded data by decrypting the encrypted data and a decoder module to generate at least the content by decoding the encoded data.

Example 4

This example includes the elements of example 3, wherein the decryption module stores the encoded data in the secure memory space.

Example 5

This example includes the elements of any of examples 3 to 4, wherein the decoder module is further to generate digital rights management (DRM) data corresponding to the content from the encoded data.

Example 6

This example includes the elements of example 5, wherein the communication module receives the encrypted data from a content provider.

Example 7

This example includes the elements of example 6, wherein the content provider is to utilize a second TEE module including a secure multiplex transform (SMT) module to encode the content and DRM data into the encoded data and to encrypt the encoded data into the encrypted data.

Example 8

This example includes the elements of any of examples 6 to 7, wherein the communication module is further to receive the encrypted data from the content provider via a Data as a Service (DaaS) display controller.

Example 9

This example includes the elements of example 8, wherein the DaaS display controller is to distribute the encrypted data to at least one device or set of devices for presenting the content.

Example 10

This example includes the elements of any of examples 6 to 9, wherein the SDT module further comprises an attestation module to communicate via a secure communication session to at least one of provide data for validating the TEE module or to receive at least one key for use in generating the content.

Example 11

This example includes the elements of example 10, wherein the secure communication session is a secure sign and mac (SIGMA) communication session signed by the TEE module using an Enhanced Privacy Identification (EPID).

Example 12

This example includes the elements of any of examples 10 to 11, wherein the attestation module is further to cause the communication module to establish the secure communication session with the content provider.

Example 13

This example includes the elements of any of examples 10 to 12, wherein the attestation module is further to cause the communication module to establish the secure communication session with a trust broker.

Example 14

This example includes the elements of any of examples 10 to 13, wherein the attestation module is further to cause the communication module to establish the secure communication session with at least one of the content provider or a trust broker.

Example 15

This example includes the elements of any of examples 1 to 14, wherein the SDT module is further to encrypt the content using a second encryption protocol prior to providing the content to the UI module.

Example 16

This example includes the elements of example 15, wherein the second encryption protocol is a Protected Audio Video Path (PAVP) encryption protocol.

Example 17

This example includes the elements of any of examples 15 to 16, wherein the UI module comprises a presentation engine to decrypt the encrypted content, to generate presentation data from the decrypted content and to encrypt the presentation data using a third encryption protocol and presentation equipment to decrypt the encrypted presentation data and to present the presentation data.

Example 18

This example includes the elements of example 17, wherein the third encryption protocol is a High-Bandwidth Content Protection (HDCP) encryption protocol.

Example 19

According to this example there is provided a method for content protection. The method may comprise receiving data encrypted using a first encryption protocol in a device including at least a trusted execution environment (TEE) module, decoding the encrypted data in a secure demultiplex transform (SDT) module in the TEE module, generating content from the decrypted data in the SDT module and presenting the content.

Example 20

This example includes the elements of example 19, and further comprises determining if Data as a Service (DaaS) is available in the device.

Example 21

This example includes the elements of example 20, and further comprises provisioning a presentation device sharing engine in the device if it is determined that DaaS is available in the device.

Example 22

This example includes the elements of example 21, and further comprises determining if a trust broker is handling TEE module validation and key distribution if it is determined that DaaS is available in the device.

Example 23

This example includes the elements of example 22, and further comprises providing at least data for validating the TEE module to the trust broker if it is determined that the trust broker is handling TEE module validation and key distribution.

Example 24

This example includes the elements of any of examples 22 to 23, and further comprises requesting at least one key for use in decoding the encrypted data, the at least one key being requested from the trust broker or a content provider.

Example 25

This example includes the elements of any of examples 19 to 24, wherein presenting the content comprises encrypting the content using a second encryption protocol in the TEE module.

Example 26

This example includes the elements of example 25, wherein the second encryption protocol is a Protected Audio Video Path (PAVP) encryption protocol.

Example 27

This example includes the elements of any of examples 25 to 26, wherein presenting the content further comprises decrypting the encrypted content in a user interface (UI) module in the device, generating presentation data based on the decrypted content and encrypting the presentation data based on a third encryption protocol.

Example 28

This example includes the elements of example 27, wherein the third encryption protocol is a High-Bandwidth Content Protection (HDCP) encryption protocol.

Example 29

This example includes the elements of any of examples 27 to 28, wherein presenting the content further comprises decrypting the encrypted presentation data in presentation equipment associated with the UI module and presenting the decrypted presentation data via the presentation equipment.

Example 30

This example includes the elements of any of examples 19 to 29, and further comprises determining if Data as a Service (DaaS) is available in the device and provisioning a presentation device sharing engine in the device if it is determined that DaaS is available in the device.

Example 31

This example includes the elements of example 30, and further comprises determining if a trust broker is handling TEE module validation and key distribution if it is determined that DaaS is available in the device and providing at least data for validating the TEE module to the trust broker if it is determined that the trust broker is handling TEE module validation and key distribution.

Example 32

This example includes the elements of any of examples 19 to 31, wherein presenting the content further comprises encrypting the content using a second encryption protocol in the TEE module, decrypting the encrypted content in a user interface module (UI) in the device, generating presentation data based on the decrypted content, encrypting the presentation data based on a third encryption protocol, decrypting the encrypted presentation data in presentation equipment associated with the UI module and presenting the decrypted presentation data via the presentation equipment.

Example 33

According to this example there is provided a system including at least one device, the system being arranged to perform the method of any of the above examples 19 to 32.

Example 34

According to this example there is provided a chip set arranged to perform the method of any of the above examples 19 to 32.

Example 35

According to this example there is provided at least one machine readable medium comprising a plurality of instructions that, in response to be being executed on a computing device, cause the computing device to carry out the method according to any of the above examples 19 to 32.

Example 36

According to this example there is provided at least one device configured for content protection for data as a service, the at least one device being arranged to perform the method of any of the above examples 19 to 32.

Example 37

According to this example there is provided a system for content protection. The system may comprise means for receiving data encrypted using a first encryption protocol in a device including at least a trusted execution environment (TEE) module, means for decoding the encrypted data in a secure demultiplex transform (SDT) module in the TEE module, means for generating content from the decrypted data in the SDT module and means for presenting the content.

Example 38

This example includes the elements of example 37, and further comprises means for determining if Data as a Service (DaaS) is available in the device and means for provisioning a presentation device sharing engine in the device if it is determined that DaaS is available in the device.

Example 39

This example includes the elements of example 38, and further comprises means for determining if a trust broker is handling TEE module validation and key distribution if it is determined that DaaS is available in the device.

Example 40

This example includes the elements of example 39, and further comprises means for providing at least data for validating the TEE module to the trust broker if it is determined that the trust broker is handling TEE module validation and key distribution.

Example 41

This example includes the elements of example 40, and further comprises means for requesting at least one key for use in decoding the encrypted data, the at least one key being requested from the trust broker or a content provider.

Example 42

This example includes the elements of any of examples 37 to 41, wherein the means for presenting the content comprise means for encrypting the content using a second encryption protocol in the TEE module, means for decrypting the encrypted content in a user interface (UI) module in the device, means for generating presentation data based on the decrypted content and means for encrypting the presentation data based on a third encryption protocol.

Example 43

This example includes the elements of example 42, wherein the means for presenting the content further comprise means for decrypting the encrypted presentation data in presentation equipment associated with the UI module and means for presenting the decrypted presentation data via the presentation equipment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device configured for content protection, comprising:
   communication circuitry to at least receive data encrypted using a first encryption protocol, the received encrypted data including content, the content comprising at least a first portion associated with a display of a plurality of displays that collectively form a composite display, and a second portion unassociated with the display for presenting the content;
   user interface (UI) circuitry coupled to the display of the plurality of displays to at least present the first portion of the content; and
   trusted execution environment (TEE) circuitry including at least a secure demultiplex transform (SDT) circuitry to generate the first portion of the content and digital rights management (DRM) data corresponding to the first portion of the content from the encrypted data, and encrypt at least the first portion of the content using a content protection encryption protocol prior to providing the first portion of the content and DRM data to the UI circuitry,
   wherein the UI circuitry includes at least a presentation engine to decrypt the encrypted first portion of the content, generate presentation data from the decrypted first portion of content and encrypt the presentation data using a DRM encryption protocol, and decrypt the encrypted presentation data and present the presentation data via the display of the plurality of displays based on the DRM data.

2. The device of claim 1, wherein the TEE circuitry comprises at least a secure memory space accessible to only applications in the device verified as safe by the TEE circuitry.

3. The device of claim 1, wherein the SDT comprises:
   decryption circuitry to generate encoded data by decrypting the encrypted data; and
   decoder circuitry to generate at least the first portion of the content by decoding the encoded data.

4. The device of claim 3, wherein the decoder circuitry is further to generate digital rights management (DRM) data corresponding to the first portion of the content from the encoded data.

5. The device of claim 4, wherein the communication circuitry receives the encrypted data from a content provider.

6. The device of claim 5, wherein the communication circuitry is further to receive the encrypted data from the content provider via a Data as a Service (DaaS) display controller.

7. The device of claim 5, wherein the SDT circuitry further comprises attestation circuitry to communicate via a secure communication session to at least provide data for validating the TEE circuitry and/or to receive at least one key for use in generating the content.

8. The device of claim 7, wherein the attestation circuitry is further to cause the communication circuitry to establish the secure communication session with at least one of the content provider or a trust broker.

9. A method for content protection, comprising:
   receiving data encrypted using a first encryption protocol in a device including at least trusted execution environment (TEE) circuitry, the received encrypted data including content, the content comprising at least a first portion associated with a display of a plurality of displays that collectively form a composite display, and a second portion unassociated with the display for presenting the content;
   decrypting the encrypted data in a secure demultiplex transform (SDT) circuitry in the TEE circuitry;
   generating the first portion of the content and digital rights management (DRM) data corresponding to the first portion of the content from the decrypted data in the SDT circuitry;
   encrypting at least the first portion of the content using a content protection encryption protocol in the SDT circuitry;
   decrypting at least the encrypted first portion of the content in user interface (UI) circuitry in the device, wherein the UI circuitry is coupled to the display of the plurality of displays;
   generating presentation data based on the decrypted first portion of the content;
   encrypting the presentation data based on a DRM encryption protocol;
   decrypting the encrypted presentation data in the display associated with the UI circuitry; and
   presenting the decrypted presentation data based on the DRM data via the display.

10. The method of claim 9, further comprising:
    determining if Data as a Service (DaaS) is available in the device; and
    provisioning a presentation device sharing engine in the device if it is determined that DaaS is available in the device.

11. The method of claim 10, further comprising:
    determining if a trust broker is handling TEE circuitry validation and key distribution if it is determined that DaaS is available in the device.

12. The method of claim 11, further comprising:
    providing at least data for validating the TEE circuitry to the trust broker if it is determined that the trust broker is handling TEE circuitry validation and key distribution.

13. The method of claim 12, further comprising:
    requesting at least one key for use in decoding the encrypted data, the at least one key being requested from the trust broker or a content provider.

14. At least one non-transitory machine-readable storage medium having stored thereon, individually or in combination, instructions that when executed by one or more processors result in the following operations for content protection, comprising:
    receiving data encrypted using a first encryption protocol in a device including at least trusted execution environment (TEE) circuitry, the received encrypted data including content, the content comprising at least a first portion associated with a display of a plurality of displays that collectively form a composite display, and a second portion unassociated with the display for presenting the content;
    decrypting the encrypted data in a secure demultiplex transform (SDT) module in the TEE circuitry;

generating content and digital rights management (DRM) data corresponding to the content from the decrypted data in the SDT circuitry;

encrypting at least the first portion of the content using a content protection encryption protocol in the SDT circuitry;

decrypting at least the encrypted first portion of the content in user interface (UI) circuitry in the device, wherein the UI circuitry is coupled to the display of the plurality of displays;

generating presentation data based on the decrypted first portion of the content;

encrypting the presentation data based on a DRM encryption protocol;

decrypting the encrypted presentation data in the display associated with the UI circuitry; and presenting the decrypted presentation data based on the DRM data via the display.

15. The medium of claim 14, further comprising instructions that when executed by one or more processors result in the following operations comprising:

determining if Data as a Service (DaaS) is available in the device; and provisioning a presentation device sharing engine in the device if it is determined that DaaS is available in the device.

16. The medium of claim 15, further comprising instructions that when executed by one or more processors result in the following operations comprising:

determining if a trust broker is handling TEE circuitry validation and key distribution if it is determined that DaaS is available in the device.

17. The medium of claim 16, further comprising instructions that when executed by one or more processors result in the following operations comprising:

providing at least data for validating the TEE circuitry to the trust broker if it is determined that the trust broker is handling TEE circuitry validation and key distribution.

18. The medium of claim 17, further comprising instructions that when executed by one or more processors result in the following operations comprising:

requesting at least one key for use in decoding the encrypted data, the at least one key being requested from the trust broker or a content provider.

* * * * *